United States Patent [19]

Yuen et al.

[11] Patent Number: 5,042,565

[45] Date of Patent: Aug. 27, 1991

[54] FIBER REINFORCED COMPOSITE LEADING EDGE HEAT EXCHANGER AND METHOD FOR PRODUCING SAME

[75] Inventors: James L. Yuen, Thousand Oaks; Beverly A. Ash, Oxnard; William P. Purmort, Simi Valley, all of Calif.

[73] Assignee: Rockwell International Corporation, El Segundo, Calif.

[21] Appl. No.: 472,541

[22] Filed: Jan. 30, 1990

[51] Int. Cl.$^5$ ............................. F28F 3/12; B64C 1/38
[52] U.S. Cl. ........................................ 165/41; 165/171; 165/168; 165/905; 244/117 A; 244/158 A
[58] Field of Search ................. 165/168, 171, 905, 41, 165/169; 244/117 A, 158 A

[56] References Cited

U.S. PATENT DOCUMENTS

| | | | |
|---|---|---|---|
| 4,545,429 | 10/1985 | Place, Jr. .............................. | 165/169 |
| 4,671,348 | 6/1987 | Bauer ..................................... | 165/41 |
| 4,786,015 | 11/1988 | Niggemann ...................... | 244/117 A |
| 4,838,346 | 6/1989 | Camarda et al. ...................... | 165/41 |

FOREIGN PATENT DOCUMENTS 1048872 11/1966 United Kingdom.

Primary Examiner—Albert W. Davis, Jr.
Attorney, Agent, or Firm—H. Fredrick Hamann; Harry B. Field; Steven E. Kahm

[57] ABSTRACT

A braided fiber reinforced composite, particularly a braided graphite fiber reinforced copper composite leading edge heat exchanger 18 is disclosed, formed of inlet and outlet conduits 22 and 24 and means forming a plurality of passages 26 interconnecting the conduits, as a single integral unit. The heat exchanger is formed by providing inlet and outlet manifolds 36 and 38, successively interconnecting a plurality of mandrels 40, 52 and 56 transversely between the manifolds and braiding reinforcing fibers 32 preferably having high elevated temperature strength and high thermal conductivity, e.g. graphite fibers, around each of the mandrels and the manifolds, the braiding progressing in a direction along the length of the manifolds. The resulting braided preform 58 is consolidated by introducing a matrix material of high thermal conductivity, such as copper or copper alloy, e.g. as by molten infiltration, into the braided preform 58 and removing the mandrels and manifolds from the consolidated preform, as by leaching.

14 Claims, 2 Drawing Sheets

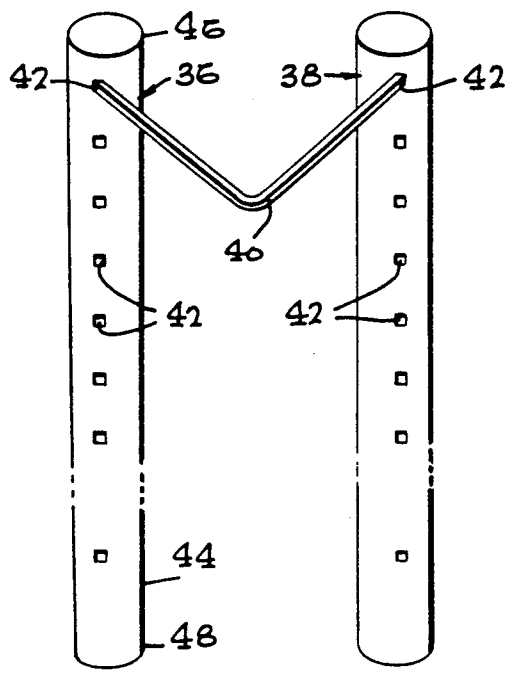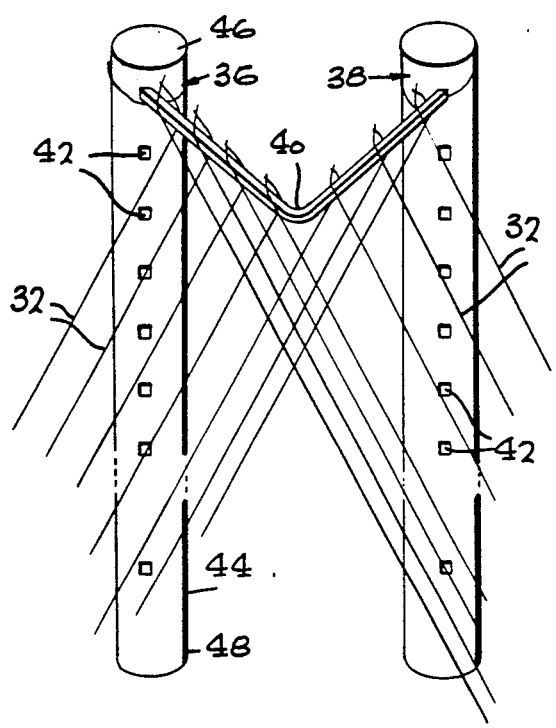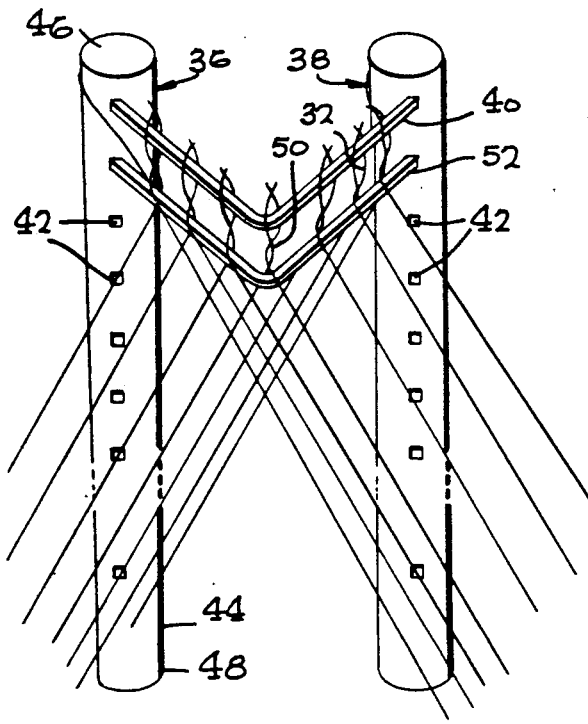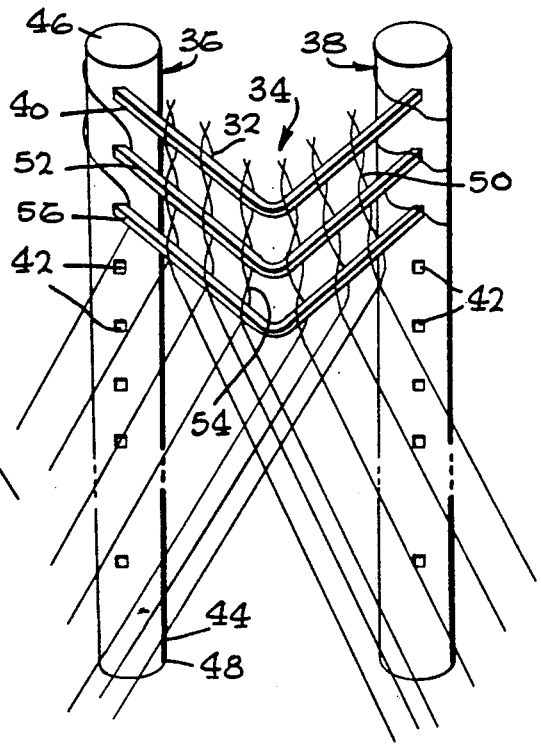

FIBER REINFORCED COMPOSITE LEADING EDGE HEAT EXCHANGER AND METHOD FOR PRODUCING SAME

STATEMENT OF GOVERNMENT INTEREST

The Government has rights in this invention pursuant to Contract F33657-87-C-2214 awarded by the U. S. Department of Air Force.

BACKGROUND OF THE INVENTION

1. Field of the Invention

This invention relates to heat exchangers, and is particularly concerned with fiber reinforced composite leading edge heat exchangers for aerospace application.

2. Description of the Prior Art

Heat exchangers used in high heat flux applications such as in the leading edges of hypersonic cruise vehicles, combustion chamber walls of rocket engines, and engine walls of combined-cycle engines require materials that have high thermal conductivity, good strength at cryogenic and elevated temperatures, and excellent resistance to thermal mechanical fatigue. These heat exchangers are designed to be thermally efficient yet meet the structural load requirements. As a result, the heat exchanger configurations for these aerothermal applications often involves an array of intricate parallel subsurface cooling passages that have a high pressure fluid flowing within them. The wall thicknesses of the face sheet and lands are typically less than 0.05 inch and are held to very tight tolerances. FIG. 1 illustrates the intricate cooling fluid passages 10 in a prior art heat exchanger section 12 having walls 14 and lands 16 between passages 10.

British Patent No. 1,048,872 to Junkers discloses a method of cooling the outer skin of aircraft in which fuel as coolant is fed before combustion through passages forming the leading edge of the aircraft wing, for cooling portions of the outer skin.

U.S. Pat. No. 4,786,015 to Niggemann discloses a cooling unit for dissipating aerodynamic heating in hypersonic aircraft formed of a load bearing structure for the leading edge of an airfoil. The load bearing structure is of hollow construction defining a fluid path at one end and a fluid outlet at the other end, the fluid path comprising a tortuous path through the load bearing structure. The load bearing structure of this patent is comprised of hollow metal tubes helically wound in side-by-side relation, into an elongated tubular configuration.

SUMMARY OF THE INVENTION

According to the invention, a fiber reinforced composite, particularly a graphite fiber reinforced copper composite, can be tailored to meet the aforementioned design requirements for leading edge heat exchangers, and also to facilitate the fabrication of such heat exchangers. More particularly, and according to a preferred embodiment, the present invention embodies the utilization of a braided fiber, particularly graphite fiber, reinforcement arrangement for composite, particularly copper or copper alloy matrix, leading edge heat exchangers with integral inlet and outlet conduits for aerothermal applications.

Mandrels are used in the braiding process to define the passages to be formed in the fiber reinforced matrix composite heat exchanger hereof. The mandrels are interconnected with inlet and outlet manifolds which are to form the inlet and outlet conduits in the composite heat exchanger. The mandrels are successively interconnected transversely between the manifolds; and a reinforcing fiber, such as graphite, fiber is braided around each of the successive mandrels after installation thereof on the manifolds, and around the adjacent portion of the inlet and outlet manifolds, to form a braided preform.

The braided preform is then rigidized and consolidated while on the arrangement of the manifolds and mandrels, as by introduction of a matrix material of high thermal conductivity, such as copper or copper alloys, e.g. by molten infiltration, into the fiber preform. The mandrels and inlet and outlet manifolds can then be removed from the consolidated preform, to form a fiber reinforced matrix composite, particularly a graphite fiber reinforced copper composite, having inlet and outlet conduits and a plurality of transversely disposed passages interconnecting the conduits, and wherein the reinforcing fiber is braided in the matrix material, resulting in the desired heat exchanger. Leachable manifolds and mandrels can be employed to facilitate removal thereof as by selective chemical removal, e.g. leaching, after consolidation of the preform.

OBJECTS OF THE INVENTION

It is accordingly one object of the present invention to provide an improved fiber reinforced composite leading edge heat exchanger having high thermal conductivity, good strength at cryogenic and elevated temperatures, and high resistance to thermal mechanical fatigue.

Another object is the provision of a fiber reinforced composite leading edge heat exchanger having a braided fiber construction.

A further object is to provide a graphite fiber reinforced copper composite leading edge heat exchanger having the aforementioned characteristics.

Yet another object is the provision of procedure for fabricating the above leading edge heat exchanger.

Other objects and advantages of the invention will be apparent or made obvious by the description below of certain specific embodiments of the invention.

DESCRIPTION OF THE DRAWINGS

FIGS. 4a, 4b, 4c, and 4d illustrate the basic arrangement and process for producing the fiber reinforced composite leading edge heat exchanger of the invention, including inlet and outlet manifolds and interconnecting mandrels for successively braiding reinforcing fibers around successive mandrels and the adjacent portions of the inlet and outlet manifolds.

DETAILED DESCRIPTION OF THE INVENTION AND PREFERRED EMBODIMENTS

Figure 1:
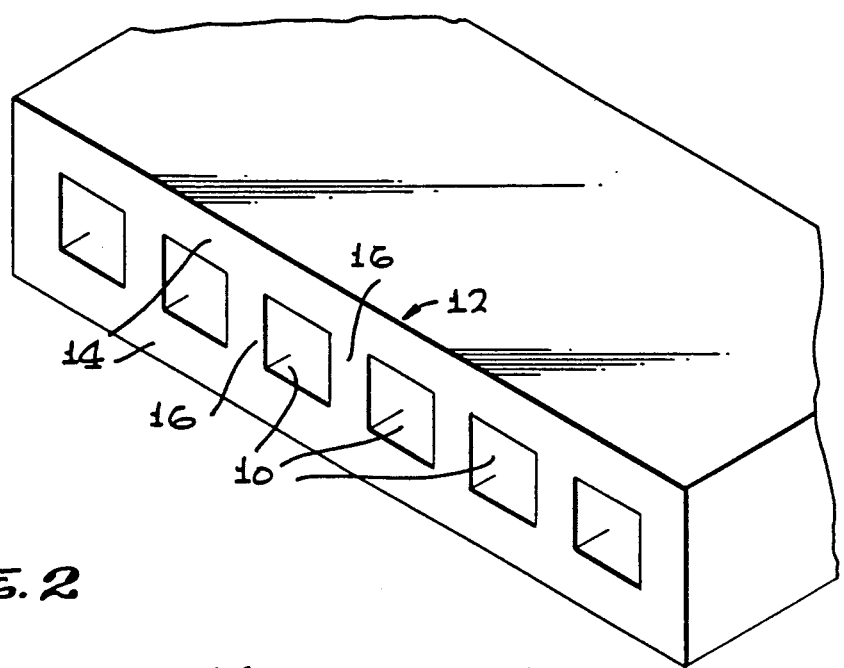
FIG. 1 illustrates the general construction of a prior art leading edge heat exchanger.
Figure 2:
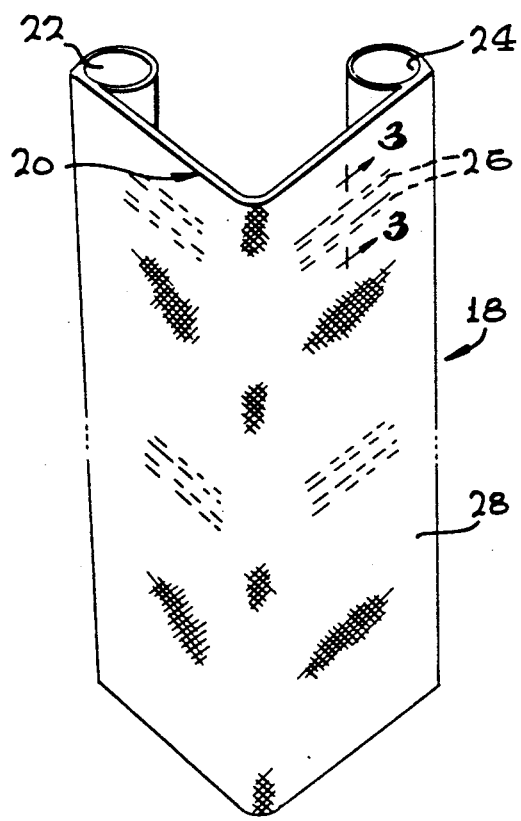
FIG. 2 illustrates the high conductivity composite leading edge heat exchanger produced according to the invention.

Referring to FIG. 2 of the drawing, there is illustrated a leading edge heat exchanger 18 according to the invention. The leading edge fiber reinforced composite heat exchanger has a V-shape as illustrated at 20 to match the configuration of the leading edge of an aerospace vehicle, such as a hypersonic cruise vehicle, to which it is applied. The heat exchanger 18 incorporates an inlet conduit 22 for introduction of a cryogenic coolant fluid such as hydrogen gas, and an outlet conduit 24. Interconnecting the inlet conduit 22 and the outlet conduit 24, as seen in FIG. 3, is a series of essentially parallel passages of appropriate geometry, e.g. 26, formed in the composite wall 28 of the heat exchanger, and separated by the lands 30 of the composite.

Figure 3:
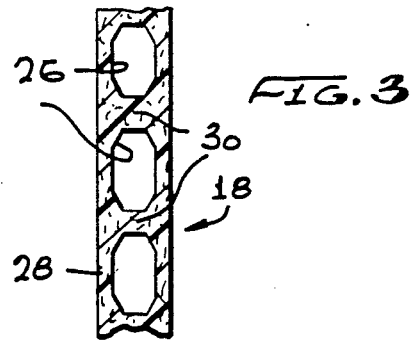
FIG. 3 is an enlarged section taken on line 3—3 of FIG. 2.

In the process of producing the composite leading edge heat exchanger of the invention illustrated in FIGS. 2 and 3, and referring to FIGS. 4a to 4d, fiber tows at 32 are braided around a skeleton structure indicated generally at 34, which has the exact inside geometry of the coolant passages, e.g. 26, and interconnected inlet and outlet conduits 22 and 24 of FIGS. 2 and 3. In assembling the skeleton structure 34, according to one embodiment, referring to FIG. 4a, there is provided an inlet manifold 36 and an outlet manifold 38, and a first coolant passage mandrel 40 of substantially square cross section and having the V-shape configuration 20 of the leading edge exchanger to be formed, is inserted into suitable square indents 42 formed in the inlet manifold 36 and outlet manifold 38. The manifolds 36 and 38 and the mandrels 40 are constructed of a leachable material such as iron or sintered strontium oxide, which can be leached out and removed after the composite heat exchanger has been formed, as by treatment in a leaching solution such as aqueous solutions of hydrochloric acid, nitric acid, sulfuric acid, or mixtures thereof, for leaching iron, or water or an aqueous acid solution for leaching strontium oxide. However, it will be understood that other materials of construction for the inlet and outlet manifolds 36 and 38 and the mandrels 40 can be employed, which can be removed or leached as by selective chemical treatment.

It will be noted that the inlet manifold 36 has a tapered shape 44 from the upstream end 46 to the downstream end 48 so as to form a correspondingly shaped inlet conduit 22 in the final heat exchanger, in order to deliver uniform flow of coolant to all of the coolant channels 26 in the heat exchanger circuit, with the outlet conduit 24 formed by leaching outlet mandrel 38, required to duct the heated coolant from the leading edge heat exchanger.

The skeleton structure 34 formed of the inlet and outlet manifold 36 and 38 and the interconnecting mandrels 40 are utilized to provide a braided preform which is consolidated with matrix material. In order to provide such braided preform, fibers are employed which can be readily braided and woven, and which preferably have high elevated temperature strength and high thermal conductivity. For this purpose, graphite fibers have been found most suitable, although other fibers such as organic fibers, e.g. polyamides (Kevlar) can be employed. For production of a high performance leading edge heat exchanger according to the invention, graphite fiber tows 32 having a relatively small filament count are preferred. Thus, fiber tows with a filament count of less than 1,000 filaments are desirable, and particularly fiber tows with a filament count of less than 500 filaments. These tows are required to form the thin faced sheets or walls 28 and the thin lands 30, which are preferably less than 0.05 inch thick, between the passage 26 of the heat exchanger.

In the braiding process, as seen in FIGS. 4b through 4d, the fiber tows 32 are braided around a series of successive mandrels 40 and around the adjacent periphery of the opposite inlet and outlet manifolds 36 and 38. As seen in FIG. 4b, the braiding apparatus operates like a maypole, with the carriers thereon working in pairs to accomplish an over and under braiding sequence over each mandrel. A braiding apparatus of this type is illustrated in "Composite Materials Handbook", M. M. Schwartz, McGraw Hill Book Company, 1984, pages 4–97, and the article "Braids and Knits: Reinforcement in Multidirections," A. J. Klein, Advanced Composites, September/October 1987, page 36. Each fiber tow indicated at 32 is arranged to pass over the mandrels 40 of the skeleton structure 34 in a diagonal manner with the braiding progressing in a direction substantially extending along the length of and parallel to the manifolds 36 and 38. The fibers are oriented at angles +Theta and −Theta to the braid axis.

After interconnection of the first mandrel 40 on the manifolds 36 and 38, as indicated in FIG. 4a, the fiber tows 32 are braided around the first mandrel 40 and around the adjacent periphery of the inlet and outlet manifolds 36 and 38, as shown in FIG. 4b, to provide an over and under braid sequence. At the first set of braid tow crossings as indicated at 50 in FIG. 4c, another coolant passage leachable mandrel 52 is inserted into the indents 42 of the inlet and outlet manifolds 36 and 38, below manifold 40, and then another over and under braid sequence is carried out to braid the fiber tow around the second mandrel 52 and around the adjacent peripheral portions of inlet and outlet manifolds 36 and 38 to form another tow crossing at 54 as in FIG. 4d. Then a third successive mandrel 56 is inserted at its ends into indents 42 of the inlet and outlet manifolds 36 and 38, below mandrel 52, and an additional over and under braid sequence is carried out over the third mandrel 56 and over the adjacent portion of the periphery of manifolds 36 and 38. This successive sequence of tow crossing and mandrel insertion is repeated the desired number of times to build up the leading edge heat exchanger preform to the desired length.

Thus a fiber web or preform is fabricated over the skeleton structure 34 formed of the inlet and outlet manifolds 36 and 38, and the mandrels 40, 52 and 56, where the preform is an integral arrangement in the absence of any cuts or machining of the fiber preform, and such a preform is fabricated in a single braiding operation. Each of the braided fibers aids in supporting the manifolds and the mandrels.

Figure 5:
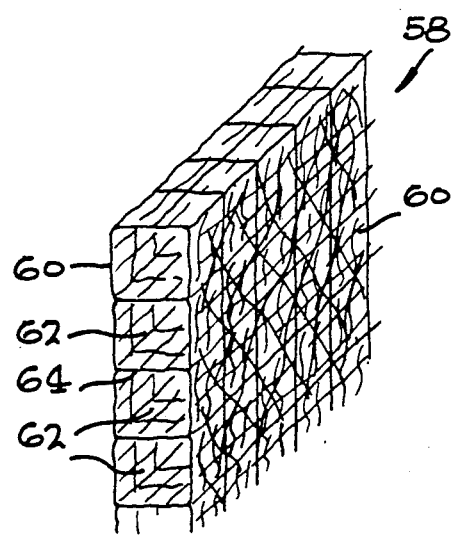
FIG. 5 is a schematic illustration of the braided architecture of the fiber preform produced by the arrangement and process illustrated in FIGS. 4a through 4d, and which is thereafter consolidated to produce the leading edge heat exchanger of the invention, illustrated in FIG. 2.

The result of the braiding operation is a fabric preform 58, as illustrated in FIG. 5, which includes fibers that are oriented in direction of mandrels 40, 52 and 56, and are included in the heat exchanger faces 60 and lands 64. The preform 58 is formed of a structure having wall portions 60, and a series of parallel passages 62 separated by lands 64. Since the woven preform 58 is in the form of a fabric, the preform must be rigidized and consolidated. A continuous braided graphite fiber reinforced copper composite can be produced by consolidation as by molten infiltration of copper or copper alloy, or electroless deposition of copper on the preform, or by use of pre-copper-coated graphite fiber woven into preforms that can be consolidated by a method such as hot isostatic pressing.

Since the invention is particularly designed for high heat flux leading edge heat exchangers, it is necessary to employ a high thermal conductivity matrix material for incorporation into the woven preform, such as copper or silver, or their alloys. Where consolidation procedures such as molten infiltration or electroless deposition of copper is employed, it is first necessary to construct an outer die having essentially the outer shape of the leading edge heat exchanger, so that the heat exchanger shape can be maintained during the consolidation. In molten infiltration, molten copper or copper alloy is introduced into the die for consolidation into the preform, and where electroless deposition of copper is employed, suitable solutions well known in the art of electroless deposition of copper are introduced into the die for consolidation of the preform with copper. Where hot isostatic pressing is employed for preform consolidation, a die is formed of the desired shape of the leading edge heat exchanger, and the copper-containing graphite fiber preforms are consolidated under elevated temperature and pressure.

Following formation of the consolidated preform to produce the braided graphite fiber reinforced copper composite on the skeleton structure 34 formed of the mandrels 40, 52 and 56 and the inlet and outlet manifolds 36 and 38, it is necessary to remove such skeleton structure. This is accomplished by leaching the leachable mandrels and manifolds by treating the entire structure in a chemical leaching solution such as a solution of nitric and concentrated sulfuric acids, for iron mandrels and manifolds. Following removal of the mandrels and manifolds of the skeleton structure 34, there remains the braided graphite fiber reinforced copper composite leading edge heat exchanger illustrated at 18 in FIGS. 2 and 3.

Various modifications of the leading edge heat exchanger of the invention and its method of fabrication can be practiced within the skill of the art. Thus, for example, fibers with different properties, for example elastic modulus and thermal conductivity, or combinations of fibers with different properties can be selected to produce a fiber reinforced composite with desired specific characteristics. Such fibers can be selectively placed in specific regions of the braided article or can be used to enhance properties in a particular direction.

From the foregoing, it is seen that a braided fiber reinforced composite leading edge heat exchanger can be produced according to the invention employing as an important feature a skeleton structure of removable or leachable mandrels and inlet and outlet manifolds, and successively braiding fibers over successive mandrels and around the adjacent inlet and outlet manifolds to form the intricate coolant channels and the integral inlet and outlet conduits, the resulting fiber preform being readily rigidized and consolidated with a high thermal conductivity matrix material such as copper, and the mandrels and manifolds of the skeleton structure leached to produce the heat exchanger of the invention.

It is to be understood that what has been described is merely illustrative of the principles of the invention and that numerous arrangements in accordance with this invention may be devised by one skilled in the art without departing from the spirit and scope thereof.

What is claimed is:

1. A leading edge heat exchanger for aerothermal applications which comprises
   inlet and outlet conduits, each having a wall, and
   means forming a plurality of passages and containing lands between said passages, said passages interconnecting said conduits,
   said conduits and said means forming said passages being integral and formed of a composite consisting of a fiber reinforced matrix material of high thermal conductivity, the reinforcing fiber being braided in said matrix material and in the lands around said passages and in the wall around said conduits.

2. The leading edge heat exchanger of claim 1, said passages being disposed transversely between said conduits.

3. The leading edge heat exchanger of claim 1, the inlet conduit being tapered from the upstream to the downstream end thereof.

4. The leading edge heat exchanger of claim 1, the reinforcing fiber having high elevated temperature strength and high thermal conductivity, and capable of being braided.

5. The leading edge heat exchanger of claim 1, said matrix material selected from the group consisting of copper and silver, and their alloys.

6. The leading edge heat exchanger of claim 2, said composite being graphite fiber reinforced copper.

7. A leading edge heat exchanger for hypersonic vehicles in the form of a fiber reinforced composite consisting of a matrix material of high thermal conductivity and a reinforcing fiber having high elevated temperature strength and high thermal conductivity, said composite comprising
   inlet and outlet conduits,
   a wall interconnecting and integral with said conduits,
   transverse passages in said wall and communicating with said conduits, and
   lands separating said passages,
   said reinforcing fiber being braided in said matrix in said wall and in said lands, and in the matrix material around said inlet and said outlet conduits.

8. The leading edge heat exchanger of claim 7, said matrix material being copper and said reinforcing fiber being graphite fiber.

9. A leading edge heat exchanger for hypersonic vehicles produced by the process which comprises
   providing an inlet manifold and an outlet manifold,
   successively interconnecting a plurality of mandrels transversely between said manifolds,
   braiding a reinforcing fiber having high elevated temperature strength and high thermal conductivity around each of said successive mandrels after installation thereof, and around the adjacent portion of said inlet and outlet manifolds, said braiding progressing in a direction substantially extending along the length of said manifolds, to form a braided preform.
   consolidating the braided fiber preform around said manifolds and around said mandrels by introduction of a matrix material of high thermal conductivity into said braided preform, and
   removing said mandrels and said manifolds from said consolidated preform to form a braided fiber reinforced matrix composite having inlet and outlet conduits and a plurality of transversely disposed interconnecting passages.

10. The leading edge heat exchanger of claim 9, employing a plurality of tows of said fibers, the tows progressing through the braided preform in a diagonal direction, and at each set of braided tow crossings, a successive mandrel is inserted between the inlet and outlet manifolds.

11. The leading edge heat exchanger of claim 9, said matrix material selected from the group consisting of copper and silver, and their alloys.

12. The leading edge heat exchanger of claim 11, said fiber being graphite fiber and said matrix material being copper or copper alloy, to form a graphite fiber reinforced copper composite leading edge heat exchanger having integral inlet and outlet conduits.

13. The leading edge heat exchanger of claim 12, said consolidating being carried out by molten infiltration of copper or copper alloy into the braided preform, or by electroless deposition of copper into said braided preform, or by isostatic pressing of pre-copper-coated graphite braided preform.

14. The leading edge heat exchanger of claim 12, said inlet and outlet manifolds and said mandrels being formed of a material selected from the group consisting of strontium oxide and iron, and said removing of said mandrels and said manifolds being carried out by chemical leaching thereof.

* * * * *